United States Patent [19]

Dix et al.

[11] 4,025,488

[45] May 24, 1977

[54] ULTRAVIOLET LIGHT STABILIZED α-OLEFINS

[75] Inventors: James S. Dix, Greenville; Ronald D. Mathis, Taylors, both of S.C.

[73] Assignee: Phillips Petroleum Company, Bartlesville, Okla.

[22] Filed: Feb. 14, 1975

[21] Appl. No.: 549,888

Related U.S. Application Data

[63] Continuation-in-part of Ser. No. 113,651, Feb. 8, 1971, abandoned.

[52] U.S. Cl. .................. 260/45.75 N; 260/45.85 B
[51] Int. Cl.² ......................................... C08K 5/37
[58] Field of Search ............. 260/45.75 N, 45.85 B

[56] References Cited

UNITED STATES PATENTS

| | | | |
|---|---|---|---|
| 3,168,492 | 2/1965 | Doyle et al. | 260/45.85 B |
| 3,285,855 | 11/1966 | Dexter et al. | 260/45.85 S |
| 3,636,023 | 1/1972 | Murray et al. | 260/45.75 N |

OTHER PUBLICATIONS

Journal of Applied Polymer Science, vol. 16, pp. 615–626 (1972).

Plastics & Polymers, June 1968, pp. 195–203.

*Primary Examiner*—V. P. Hoke

[57] ABSTRACT

A mixture of a nickel amine complex and a hydroxyl substituted phenyl benzoate that is unusually effective as an ultraviolet light stabilizer for α-olefin polymers.

40 Claims, No Drawings

ULTRAVIOLET LIGHT STABILIZED α-OLEFINS

This is a continuation-in-part of application Ser. No. 113,651, filed Feb. 8, 1971, now abandoned.

BACKGROUND OF INVENTION

This invention relates to a mixture of (1) a nickel amine complex and (2) a hydroxyl substituted phenyl benzoate and the use thereof to reduce the degradation effect caused by ultraviolet light on α-olefin polymers.

DESCRIPTION OF THE PRIOR ART

It is well known that α-olefin polymers, such as polyethylene, polypropylene and the like, are subject to degradation as is manifested by discoloration and embrittlement of the polymers when they are exposed to sunlight or other sources of ultraviolet light. There are known ultraviolet light stabilizers which can be incorporated in α-olefin polymers, such as nickel amine complexes described in U.S. Pat. No. 3,379,680 and hydroxyl substituted phenyl benzoate compounds described in U.S. Pat. No. 3,502,613; however, the search for improved ultraviolet light stabilizers for α-olefin polymers continues.

SUMMARY OF INVENTION

It has now been found that a mixture of nickel amine complex and a hydroxyl substituted phenyl benzoate compound stabilizes α-olefin polymers against the degradation effect of ultraviolet light for a greater period of time than the ultraviolet light stability imparted to α-olefin polymers when either a nickel amine complex or a hydroxyl substituted phenyl benzoate compound is employed alone.

DESCRIPTION OF THE PREFERRED EMBODIMENTS

This invention relates to novel compositions of matter comprising the mixture of the following compounds:

1. a nickel amine complex of the formula

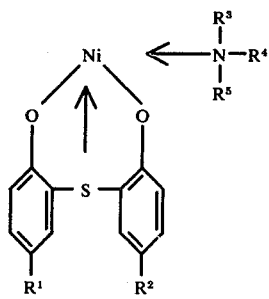

wherein $R^1$ and $R^2$ are 1 to 18 carbon atoms, alkyl, alkaryl, aryalkyl, aryl, or cycloalkyl groups; $R^3$, $R^4$ and $R^5$ are hydrogen, or the same groups as $R^1$ and $R^2$ defined above, or hydroxy or mercapto substituted groups that are the same as the $R^1$ and $R^2$ defined above. Representative of nickel amine complexes falling within the above formula are the following compounds: 2,2'-thiobis(4-t-butyl-phenolato)octadecylamine nickel II; 2,2'-thiobis(4-t-octylphenolato)-n-butyl-amine nickel II; 2,2'-thiobis(4-laurylphenolato) dimethylaniline nickel II; 2,2'-thiobis(4-cyclohexylphenolato)piperazine nickel II; 2,2'-thiobis(4-t-octylphenolato)pentadecylamine nickel II; 2,2'-thiobis(4-octylphenolato) nickel II; 2,2'-thiobis(4-t-octylphenolato)triethanolamine nickel II.

2. a hydroxyl substituted phenyl benzoate of the formula

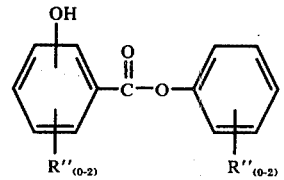

wherein $R''$ is alkyl, and cycloalkyl. Representative of hydroxyl substituted phenyl benzoate compounds falling within the above formula are the following compounds: 2',4'-di-t-butylphenyl 3,5-di-t-butyl-4-hydroxybenzoate; 2',4'-dicyclooctylphenyl 3,5-dicyclooctyl-4-hydroxybenzoate; 2',4'-dioctadecylphenyl 3,5dipentadecyl-4-hydroxybenzoate; 2',4'-di(2,2'-dimethylpentylphenyl) 3,5-di(2,2-dimethylpentyl)-4-hydroxybenzoate; 4'-octylphenyl 3,5-di-t-butyl-4-hydroxybenzoate; 3',5'-dilaurylphenyl 3,5-di-t-octyl-4-hydroxybenzoate; 2'-t-butylphenyl 3,5-di(2,2-diethylbutyl)-4-hydroxybenzoate; p-octylphenyl salicylate; p-hexadecylphenyl salicylate.

This invention also relates to the use of the mixture of (1) a nickel amine complex (occasionally referred to hereafter as NAC) and (2) a hydroxyl substituted phenyl benzoate (occasionally referred to hereafter as HSPB), as a stabilizer against ultraviolet light degradation of α-olefin polymers.

Any polymer prepared from α-olefins containing 2–10 carbon atoms per molecule can be stabilized against ultraviolet light degradation; however, stabilization of polypropylene against the degradation effect of ultraviolet light is of particular importance in the practice of this invention. Other polymers stabilized against the effects of ultraviolet light by the addition of the mixture of NAC and HSPB thereto, include homopolymers, such as polyethylene, polybutene-1, polypentene-1, polyheptene-1, polyoctene-1, polynonene-1, polydecene-1, and copolymers thereof such as ethylene-propylene, ethylene-butene-1, ethylene-hexene-1, in either block, graft, or random copolymerized form.

The mixture of (1) a nickel amine complex and (2) a hydroxyl substituted phenyl benzoate useful as ultraviolet light stabilizers may vary in proportions by weight of from (a) 10 parts of nickel amine complex to 1 part of hydroxyl substituted phenyl benzoate to (b) 1 part of nickel amine complex to 10 parts hydroxyl substituted phenyl benzoate. Generally the weight ratio of the nickel amine complex to the hydroxy substituted phenyl benzoate will be in the range of 5:1 to 1:5, preferably in the range of 3:1 to 1:3, and more preferably in the range of 2:1 to 1:2.

Preferentially the mixture contains proportions equal to about 1 part or nickel complex to about 1 part of hydroxyl substituted phenyl benzoate.

The weight of the mixture of nickel amine complex and hydroxyl substituted phenyl benzoate can vary from about 0.05 percent to about 10 percent by weight of the α-olefin polymer. Again, for economic considerations, it is preferred that the weight of the mixture of NAC and HSPB be limited to 0.10 percent to about 3 percent by weight of the α-olefin polymer. In addition to the NAC and HSPB, other materials can be incorporated into the α-olefin polymer compositions such as other light stabilizers, heat stabilizers, antioxidants, fillers, pigments, and plasticizers.

The mixture of nickel amine complex and hydroxyl substituted phenyl benzoate can be incorporated into the α-olefin polymer compositions in any manner so long as each ingredient is uniformly distributed through the polymeric composition. A suitable procedure involves simply dry blending the stabilizer in a subdivided form with the α-olefin polymer fluff or powder, at which time any other additives can also be added, followed by mastication of the blends at temperatures wherein both the NAC and HSPB stabilizer ingredients and the polymer are molten or semi-solid.

The polymers containing the ultraviolet light stabilizers of this invention can be used in any application for which α- olefin polymers are generally employed. One important use for ultraviolet light stabilized α-olefin polymers is in the manufacture of fiber or film which is subsequently used in outdoor carpeting or wearing apparel.

The following examples illustrate convenient test methods which may be used to evaluate and select the most economical and/or most stable α-olefin polymer compositions obtained by the practice of this invention.

EXAMPLE I

Three α-olefin polymer compositions were prepared that contained (A) polypropylene, (B) antioxidant, (C) processing additives, (D) ultraviolet light stabilizer, and (E) a red color concentrate. The three polymer compositions differed accordingly: Case 1 contained a nickel amine complex, Case 2 contained a hydroxyl substituted phenyl benzoate, and Case 3 contained a mixture of a nickel amine complex and a hydroxyl substituted phenyl benzoate. The numerical value designate the quantity of each ingredient in the composition on a weight basis.

| Case 1 | | Case 2 | | Case 3 | |
|---|---|---|---|---|---|
| 100.00 | Polypropylene* | 100.00 | Polypropylene* | 100.00 | Polypropylene* |
| 0.02 | Antioxidant (a) | 0.05 | Antioxidant (b) | 0.02 | Antioxidant (a) |
| 0.10 | Processing additive (c) | 0.10 | Processing additive (c) | 0.10 | Processing additive (c) |
| 0.05 | Processing additive (d) | 0.05 | Processing additive (d) | 0.05 | Processing additive (d) |
| 4.01 | Red Color master batch (e) | 4.01 | Red Color master batch (e) | 4.01 | Red Color master batch (e) |
| 1.90 | Nickel amine complex (f) | 0.00 | Nickel amine complex (f) | 1.0 | Nickel amine complex (f) |
| 0.00 | Substituted phenyl benzoate (g) | 2.0 | Substituted phenyl benzoate (g) | 1.0 | Substituted phenyl benzoate (g) |

(a) octadecyl[3-(3,5-di-t-butyl-4-hydroxyphenyl)]propionate
(b) tetrakis[methylene(3,5-di-t-butyl-4-hydroxyhydrocinnamate)]methane
(c) dioctyl phosphite
(d) calcium stearate
(e) D1333, Hercules Inc. (25% fast Red BR-FPP, 75% polypropylene)
(f) [2,2'-thiobis(4-t-octylphenolato)]-n-butylamine nickel (II)
(g) 2',4'-di-t-butylphenyl 3,5-di-t-butyl-4-hydroxybenzoate.
*containing residual quantities of an antioxidant estimated at less than 0.002 php of 2,6-di-t-butyl-4-methylphenol.

Each composition was separately dry blended and pelletized at 425° F. After cooling, each composition was formed into 4,000 denier (18 denier per filament), crimped scarlet polypropylene tow (an untwisted assembly of fibers). Eight tow samples of each composition were then mounted on a rack so that the radiation from a twin-arc Weather-Ometer light source would penetrate the samples at approximately a 90° angle. A twin enclosed carbon arc Weather-Ometer (available from Atlas Electric Devices Company) was used which had been modified by disconnecting the water-spray cycle and adding 8, 20-watt Westinghouse fluorescent sunlamps according to the precedure described in Anal. Chem. 25, 460 (1953). The fibers were continuously exposed, with testing being conducted every 100 hours after 200 hours of exposure (i.e., each tow sample was withdrawn for testing after 200, 300, 400, 500, 600, 700, 800, 900, hours of exposure), until a breaking strength or tenacity or 1 gram per denier was reached. The original breaking strength of the tow samples was 5 grams per denier. The tenacity loss of the three polypropylene tow samples was recorded and correlated with the total exposure time. The results of the exposure of Cases 1, 2 and 3 samples are illustrated by the following table:

TABLE I

| Stabilizer System | Exposure Time Required for Tow Samples to Decrease From 5.0 Grams to 1.0 Gram per Denier Tenacity |
|---|---|
| Case 1 | 656 hrs. |
| Case 2 | 439 hrs. |
| Case 3 | 845 hrs. |

As illustrated above, unexpectedly, the mixture of a nickel amine complex and a hydroxyl substituted phenyl benzoate is 130 to 190 percent as effective in stabilizing α-olefin polymers as are the individual nickel amine complex or hydroxyl substituted phenyl benzoate at essentially the same total additive level. Although the antioxidant of Case 2 is different from that of Case 1 and 3 in composition and in amount employed, the differences, if any, in the effect of these variations on the ultraviolet light stability of the total compositions of Case 1, 2 and 3, which contain a relatively high level of ultraviolet light stabilizers, is considered to definitely be within experimental error for this test for long term exposure to ultraviolet light. Thus, the results of Case 1, 2 and 3 are considered as being from properly comparable runs.

EXAMPLE II

Four compositions of highly crystalline polypropylene having a melt flow of about 3 were prepared by blending the polypropylene with antioxidants and UV stabilizers according to the following formulations:

| Case A | Case B | Case C | Case D |
|---|---|---|---|
| 100.00 Polypropylene | 100.00 Polypropylene | 100.00 Polypropylene | 100.00 Polypropylene |
| 0.05 Antioxidant(a) | 0.05 Antioxidant(a) | 0.05 Antioxidant(a) | 0.05 Antioxidant(a) |
| 0.00 Nickel amine complex(b) | 0.50 Nickel amine complex(b) | 0.00 Nickel amine complex(b) | 0.25 Nickel amine complex(b) |
| 0.00 Substituted phenyl benzoate(c) | 0.00 Substituted phenyl benzoate(c) | 0.50 Substituted phenyl benzoate(c) | 0.25 Substituted phenyl benzoate(c) |

(a) octadecyl[3-(3,5-di-t-butyl-4-hydroxyphenyl)]propionate.
(b) 2,2'-thiobis(4-t-octylphenolate)cyclohexyldiethanolamine nickel (II).
(c) 2',4'-di-t-butylphenyl 3,5-di-t-butyl-4-hydroxybenzoate.

The four compositions described above were separately dry blended and then each was masticated in a Brabender Plastograph at 50 rpm's at 200° C for 5 minutes under a nitrogen atmosphere. After cooling, each composition was formed into films 5 mils thick by compression molding at 385° F. Three samples of each composition were then exposed in a modified twin enclosed carbon arc Weather-Ometer.

The samples were tested for failure every 20 hours of exposure by flexing a strip in a rolling motion so that each strip was subjected throughout its length to a bend of 180°. The results of the tests of the four compositions noted above, is set out in the following table. Failure represents a break in the strip.

TABLE II

| | Hours* to Failure | | |
|---|---|---|---|
| Case A | Case B | Case C | Case D |
| 107 | 1020 | 1220 | 1640 |

*Average of triplicate samples.

The above data show that mixtures of nickel amine complexes and substituted phenyl benzoates are 150 percent as effective as either nickel amine complexes or substituted phenyl benzoates alone as a UV stabilizer for polypropylene compositions.

We claim:

1. An improved ultraviolet light stabilized α-olefin polymer composition which comprises: (a) polymer prepared from α-olefin monomers having 2 to 10 carbon atoms per molecule; and (b) from 0.05 to about 10 parts by weight per 100 parts by weight of said polymer of an ultraviolet light stabilizing combination of approximately equal proportions of (1) 2,2'-thiobis(4t-octylphenolato)cyclohexyldiethanolamine nickel (II) and (2) 2',4'-di-t-butylphenyl 3,5-di-t-butyl-4-hydroxybenzoate.

2. A composition in accordance with claim 1 wherein said polymer is polypropylene.

3. A composition in accordance with claim 2 wherein said ultraviolet light stabilizing combination is present in amounts of from 0.05 to 2 parts by weight per 100 parts by weight of said polymer.

4. A composition in accordance with claim 3 wherein said composition further comprises an antioxidant for said polymer.

5. A composition in accordance with claim 3 wherein said composition further comprises octadecyl[3-(3,5-di-t-butyl-4-hydroxyphenyl)]propionate.

6. A composition in accordance with claim 1 wherein said composition further comprises an antioxidant for said polymer.

7. A composition in accordance with claim 6 wherein said polymer is polypropylene.

8. A composition in accordance with claim 1 wherein said polymer is polypropylene, and wherein said composition further comprises octadecyl[3-(3,5-di-t-butyl-4-hydroxyphenyl)]propionate.

9. A composition in accordance with claim 1 wherein said ultraviolet light stabilizing combination is present in amounts of from 0.05 to 2 parts by weight per 100 parts by weight of said polymer.

10. A composition in accordance with claim 9 wherein said composition further comprises an antioxidant for said polymer.

11. A composition in accordance with claim 9 wherein said composition further comprises octadecyl[3-(3,5-di-t-butyl-4-hydroxyphenyl)]propionate.

12. An improved ultraviolet light stabilized α-olefin polymer composition which comprises: (a) polymer prepared from α-olefin monomers having 2 to 10 carbon atoms per molecule; and (b) from 0.05 to about 10 parts by weight per 200 parts by weight of said polymer of an ultraviolet light stabilizing combination of approximately equal proportions of (1) [2,2'-thiobis(4-t-octylphenolato)]-n-butylamine nickel (II) and (2) 2',4'-di-t-butylphenyl 3,5-di-t-butyl-4-hydroxybenzoate.

13. A composition in accordance with claim 12 wherein said polymer is polypropylene.

14. A composition in accordance with claim 13 wherein said ultraviolet light stabilizing combination is present in amounts of from 0.05 to 2 parts by weight per 100 parts by weight of said polymer.

15. A composition in accordance with claim 14 wherein said composition further comprises an antioxidant for said polymer.

16. A composition in accordance with claim 14 wherein said composition further comprises octadecyl[3-(3,5-di-t-butyl-4-hydroxyphenyl)]propionate, dioctyl phosphite and calcium stearate.

17. A composition in accordance with claim 12 wherein said composition further comprises an antioxidant for said polymer.

18. A composition in accordance with claim 17 wherein said polymer is polypropylene.

19. A composition in accordance with claim 12 wherein said polymer is polypropylene, and wherein said composition further comprises octadecyl[3-(3,5-di-t-butyl-4hydroxyphenyl)]propionate.

20. A composition in accordance with claim 12 wherein said ultraviolet light stabilizing combination is present in amounts of from 0.05 to 2 parts by weight per 100 parts by weight of said polymer.

21. A composition in accordance with claim 20 wherein said composition further comprises an antioxidant for said polymer.

22. A composition in accordance with claim 20 wherein said composition further comprises octadecyl[3-(3,5-di-t-butyl-4-hydroxyphenyl)]propionate.

23. An improved ultraviolet light stabilized α-olefin polymer composition which comprises: (a) polymer prepared from α-olefin monomers having 2 to 10 carbon atoms per molecule; and (b) from 0.05 to about 10 parts by weight per 100 parts by weight of said polymer of an ultraviolet light stabilizing combination of (1) a nickel amine complex selected from the group consisting of 2,2'-thiobis(4-t-octylphenolato)cyclohexyldiethanolamine nickel (II) and [2,2'thiobis(4-t-octylphenolato)]-n-butylamine nickel (II), and (2) 2',4'-di-t-butylphenyl 3,5-di-t-butyl-4-hydroxybenzoate, the weight ratio of (1) to (2) being in the range of 5:1 to 1:5.

24. A composition in accordance with claim 23 wherein said polymer is polypropylene.

25. A composition in accordance with claim 24 wherein said weight ratio is in the range of 3:1 to 1:3.

26. A composition in accordance with claim 25 wherein said composition further comprises an antioxidant for said polymer.

27. A composition in accordance with claim 26 wherein said nickel amine complex is 2,2'-thiobis(4-t-octylphenolato)cyclohexyldiethanolamine nickel (II).

28. A composition in accordance with claim 27 wherein said ultraviolet light stabilizing combination is present in amounts of from 0.05 to 2 parts by weight per 100 parts by weight of said polymer, and wherein said weight ratio is in the range of about 2:1 to about 1:2.

29. A composition in accordance with claim 26 wherein said nickel amine complex is [2,2'-thiobis(4-t-octylphenolato)]-n-butylamine nickel (II).

30. A composition in accordance with claim 29 wherein said ultraviolet light stabilizing combination is present in amounts of from 0.05 to 2 parts by weight per 100 parts by weight of said polymer, and wherein said weight ratio is in the range of about 2:1 about 1:2.

31. A composition in accordance with claim 1 wherein said ultraviolet light stabilizing combination is present in an amount of about 0.5 part by weight per 100 parts by weight of said polymer.

32. A composition in accordance with claim 8 wherein said ultraviolet light stabilizing combination is present in an amount of about 0.5 part by weight per 100 parts by weight of said polymer.

33. A composition in accordance with claim 32 wherein said octadecyl-[3-(3,5-di-t-butyl-4-hydroxyphenyl)]propionate is present in an amount of about 0.05 parts by weight per 100 parts by weight of said polymer.

34. A composition in accordance with claim 12 wherein said ultraviolet light stabilizing combination is present in an amount of about 2 parts by weight per 100 parts by weight of said polymer.

35. A composition in accordance with claim 19 wherein said ultraviolet light stabilizing combination is present in an amount of about 2 parts by weight per 100 parts by weight of said polymer.

36. A composition in accordance with claim 35 wherein said octadecyl-[3-(3,5-di-t-butyl-4-hydroxypehnyl)]propionate is present in an amount of about 0.02 part by weight per 100 parts by weight of said polymer.

37. An improved ultraviolet light stabilized α-olefin polymer composition which comprises: (a) polymer prepared from α-olefin monomers having 2 to 10 carbon atoms per molecule; and (b) an amount, effective to provide ultraviolet light stabilization of said polymer, of an ultraviolet light stabilizing combination of (1) a nickel amine complex selected from the group consisting of 2,2'-thiobis(4-t-octylphenolato)cyclohexyldiethanolamine nickel (II) and [2,2'-thiobis(4-t-octylphenolato)]-n-butylamine nickel (II), and (2) 2',4'-di-t-butylphenyl 3,5-di-t-butyl-4-hydroxybenzoate, the weight ratio of (1) to (2) being in the range wherein the ultraviolet light stabilization imparted to said polymer by said combination is greater than the ultraviolet light stabilization which would be imparted to said polymer by said amount of either (1) or (2).

38. A composition in accordance with claim 37 wherein said polymer is polypropylene.

39. A composition in accordance with claim 37 wherein said nickel amine complex is 2,2'-thiobis(4-t-octylphenolato)cyclohexyldiethanolamine nickel (II).

40. A composition in accordance with claim 37 wherein said nickel amine complex is [2,2'-thiobis(4-t-octylphenolato)]-n-butylamine nickel (II).

* * * * *

UNITED STATES PATENT AND TRADEMARK OFFICE
CERTIFICATE OF CORRECTION

PATENT NO. : 4,025,488

DATED : May 24, 1977

INVENTOR(S) : James S. Dix; Ronald D. Mathis

It is certified that error appears in the above-identified patent and that said Letters Patent are hereby corrected as shown below:

Column 5, line 50, delete "(4t-" and insert -- (4-t- --. Column 6, line 38, delete "200" and insert -- 100 --; line 64, delete "-4hydroxyphenyl)" and insert -- -4-hydroxyphenyl) --. Column 8, line 10, "parts", first occurrence, should read -- part --.

Signed and Sealed this

Second Day of May 1978

[SEAL]

Attest:

RUTH C. MASON
Attesting Officer

LUTRELLE F. PARKER
Acting Commissioner of Patents and Trademarks